UNITED STATES PATENT OFFICE.

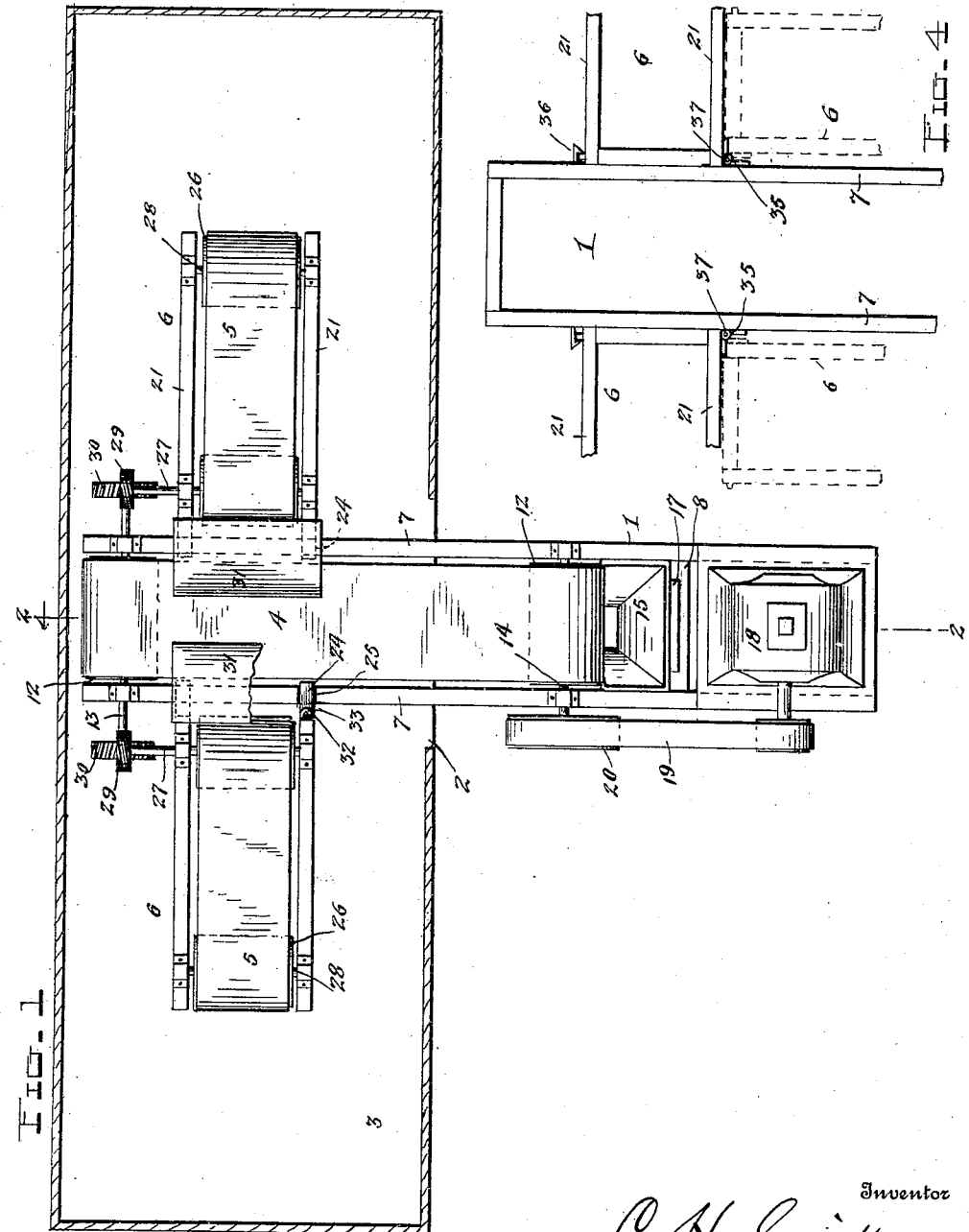

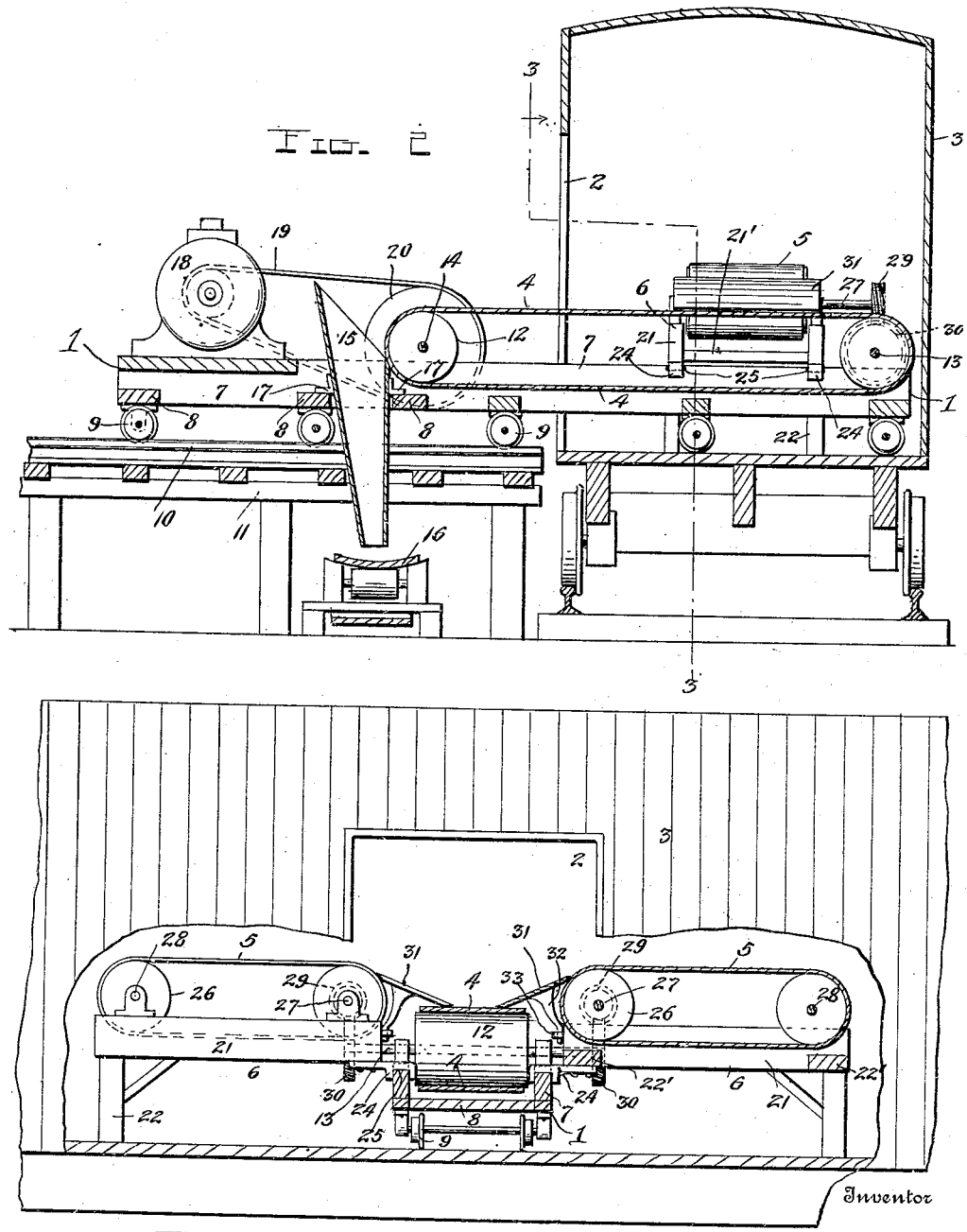

CHRISTOPHER H. SMITH, OF DEPUE, ILLINOIS.

CAR-UNLOADING DEVICE.

No. 875,385.  Specification of Letters Patent.  Patented Dec. 31, 1907.

Application filed March 28, 1907. Serial No. 365,051.

*To all whom it may concern:*

Be it known that I, CHRISTOPHER H. SMITH, a citizen of the United States, residing at Depue, in the county of Bureau and State of Illinois, have invented certain new and useful Improvements in Car-Unloading Devices, of which the following is a specification, reference being had therein to the accompanying drawing.

My invention relates to improvements in unloading devices and more particularly those adapted for unloading grain, or the like, from railway cars or other containers.

The object of the invention is to provide a simple and practical device of this character which may be readily set up for use so that it will convey grain, or the like, placed upon it from the two ends of the car to its center and then out through the car door.

With the above and other objects in view, the invention consists in the novel features of construction, combination and arrangement of parts hereinafter described and claimed, and illustrated in the accompanying drawings, in which Figure 1 is a horizontal section through a box or grain car, showing my invention in top plan; Fig. 2 is a vertical section taken on the plane indicated by the line 2—2 in Fig. 1; Fig. 3 is a side elevation of a car showing a portion of its side broken away and the unloading device partly in elevation and partly in section; and Fig. 4 is a detail view showing the manner in which the end sections or wings of the device may be folded against the main section.

My improved unloading device comprises a frame 1 mounted so that one of its ends may be projected through the door opening 2 of a grain car or the like 3 and carrying an endless belt or other conveyer 4 which receives the grain or other substance to be unloaded from two other endless belts or conveyers 5 mounted upon frames or supports 6 which extend longitudinally of the car and are preferably but not necessarily detachably connected to the main frame 1. The latter is here shown in the form of a truck consisting of side beams or sills 7 connected by cross bars 8 and having upon their lower edges bearings for the axles of supporting wheels 9 which are adapted to travel upon the bottom of the car and track rails 10 arranged upon a suitable supporting frame 11 located adjacent to the car track, as clearly shown in Fig. 2.

The main conveyer 4 is preferably in the form of a broad endless belt or band of rubber or the like and passes over pulleys or wheels 12 secured upon transverse shafts 13, 14 journaled in bearings upon the upper edges of the beams 7. The shaft 13 is located adjacent to the forward or outer end of the frame 1 and the shaft 14 adjacent to its other end so that when the first mentioned end of the frame or truck is moved into the car, the conveyer belt 4 will extend beyond the door opening 2 and will discharge the grain into a chute or spout 15 which latter in turn discharges it into a suitable receptacle or upon a moving conveyer or carrier 16 which may be of any description and which will conduct it to the desired point of discharge. The chute or spout 15 is preferably detachably mounted upon the frame or truck 1 by passing its tapered lower end between two of the cross bars 8 and providing upon it angle brackets 17 which rest upon said cross bars and support it, as seen in Fig. 2.

The conveyer 4 is preferably driven by an electric or other motor 18 arranged upon the rear or inner end of the frame 1 and having its shaft provided with a pulley which is connected by a belt or band 19 to a pully 20 upon one end of the shaft 14. Each of the wings or end frame sections 6 is composed of side beams 21 connected by cross bars 21'. The outer ends of these end sections are supported by legs or the like 22 which rest upon the car bottom and their inner ends may have any suitable folding or detachable connection with the main or intermediate frame 1. As shown in Fig. 3, this connection consists in securing upon the bottom edges of the beams 21 brackets 24 which have bifurcated ends to enter notches or seats 25 formed in the upper edges of the beams 7 so that the inner ends of the frames or sections 6 will be rigidly connected to the frame 1 and prevented from shifting either longitudinally or transversely. The conveyer belts 5 are similar to the belt 4 and pass over pulleys or the like 26 secured upon transverse shafts 27, 28 journaled in suitable bearings upon the upper edges of the beams 21. These belts are driven from the main belt 5 by providing upon the shafts 27 worms 29 which mesh with worm gears 30 secured upon the projecting ends of the shaft 13. It will be noted that when the brackets 24 are engaged with the seats 25 in attaching the frame sections 6 to the main frame 1, the worms 29 will drop into mesh with the gears 30, but it will be understood that any other suitable driving connections may be provided between said shafts. In order to prevent grain from falling between the inner ends of the belts 5 and the opposite sides of the belt 4, I provide inclined plates or chutes 31, as shown in Fig. 3. These plates are detachably mounted, preferably by engaging the lower ends of their supporting arms 32 with keeper loops or eyes 33 arranged upon the ends of the beams 21.

In using my improved unloading device, the truck 1 is moved outwardly upon the track 10 so that its forward end enters the door opening 2 of the car. The chute 15 is then placed in position and the two wings or end sections 6 are then properly adjusted upon the sides of the frame or truck 1. When the parts are thus set up and the motor is operated its motion will be imparted to the three belts or conveyers and the grain or other material to be unloaded when discharged upon the belts 5 will be carried by the latter to the center of the car and discharged from the same upon the plates 31 which in turn discharge it upon the intermediate belt 4. The latter carries it out through the door opening and discharges it into the chute 15, as before stated. It will be noted that this device will dispense with the necessity of men carrying shovels full of grain from the ends of the car to the door opening 2 and will effect a great saving in labor, since the car may be quickly unloaded when it is used.

In Fig. 4 of the drawing I have illustrated the preferred manner in which I detachably connect the wings or end sections 6 of the device to the main section 1. Each of said sections 6 has one of its side beams 21 connected to one of the side beams 7 of the frame 1 by a hinge 35 and its other side beam 21 detachably connected by a catch 36 or by any other suitable means. This construction enables the section 6 to be swung parallel with the main frame or section 1, as indicated by the dotted lines in Fig. 4, and by removing the pintles 37 of the hinge 35, the section 6 may be entirely disconnected.

Having thus described my invention what I claim and desire to secure by Letters Patent is:—

1. In an unloading device of the character described, a portable main frame mounted on supporting wheels and adapted to be projected through the door opening of a car or the like, a conveyer on said main frame, an end frame connected to the main frame and adapted to extend longitudinally of the car, and a conveyer arranged upon said end frame to discharge upon the conveyer on the main frame, substantially as described.

2. In an unloading device of the character described, a portable main frame mounted on supporting wheels and adapted to be projected through the door opening of a car or the like, an endless conveyer on the main frame, end frames connected to the opposite sides of the main frame and adapted to extend longitudinally of the car, endless conveyers on said end frames and adapted to discharge upon the conveyer on the main frame and means for driving the conveyers on the end frames from the one upon the main frame, substantially as described.

3. In an unloading device of the character described, a portable main frame mounted on supporting wheels and adapted to be projected through the door opening of a car or the like, an endless conveyer on the main frame, end frames connected to the opposite sides of the main frame and adapted to extend longitudinally of the car, endless conveyers on said end frames and adapted to discharge upon the conveyer on the main frame, means for driving the conveyers on the end frames from the one on the main frame and a motor upon the main frame for driving the conveyer thereon.

4. In an unloading device of the character described, a main frame to be projected through the door opening of a car or the like, an endless conveyer upon said frame, end frames detachably connected to the main frame and adapted to extend longitudinally of the car and endless conveyers upon said end frames to co-act with the one upon the main frame.

5. In an unloading device of the character described, a main frame to be projected through the door opening of a car or the like, an endless conveyer upon said frame, end frames to extend longitudinally of the car, endless conveyers upon said end frames, inclined plates or chutes between the conveyers on the end frames and the one on the main frame and means for driving said conveyers.

6. In an unloading device of the character described, a main frame to be projected through the door opening of a car or the like, an endless conveyer upon said frame, end frames detachably connected to the main frames and adapted to extend longitudinally of the car, endless conveyers upon said end frames, inclined plates or chutes between the conveyers on the end frames and the one on the main frame, means for driving the conveyers on the end frames from the one on the main frame and means upon the main frame for driving the conveyer thereon.

7. In an unloading device of the character described, a wheel supported truck adapted to be projected through the door opening of the car, an endless conveyer upon said frame, a receiving chute at the discharge end of said conveyer, a motor upon said main frame for driving said conveyer, end frames to extend longitudinally of the car, endless conveyers upon said end frames, means for driving the last mentioned conveyers from the one upon the main frame and inclined plates or chutes between the conveyers on the end frames and the one upon the main frame.

8. The combination of a main frame, shafts thereon, an endless conveyer between said shafts, an end frame arranged substantially at right angles to the main frame, shafts upon said end frame, an endless conveyer between said shafts and worm gearing between one of the shafts of the end frame and one of the shafts of the main frame.

9. The combination of a main frame, a conveyer thereon, an end frame extending substantially at right angles to the main frame, detachable connections attaching one end of the end frame to one side of the main frame, a conveyer on said end frame to discharge upon the one on the main frame and drive gearing connecting the two conveyers and adapted to be disconnected when the end frame is disconnected from the main frame.

10. The combination of a main frame, a conveyer thereon, an end frame arranged substantially at right angles to the main frame, a conveyer on the end frame and a removably mounted inclined plate or chute arranged between the conveyer on the end frame and the one upon the main frame, substantially as and for the purpose set forth.

In testimony whereof I hereunto affix my signature in presence of two witnesses.

CHRISTOPHER H. SMITH.

Witnesses:
WILLIAM J. SMITH,
FRANK HARLAN ALLEN.